Patented Apr. 4, 1950

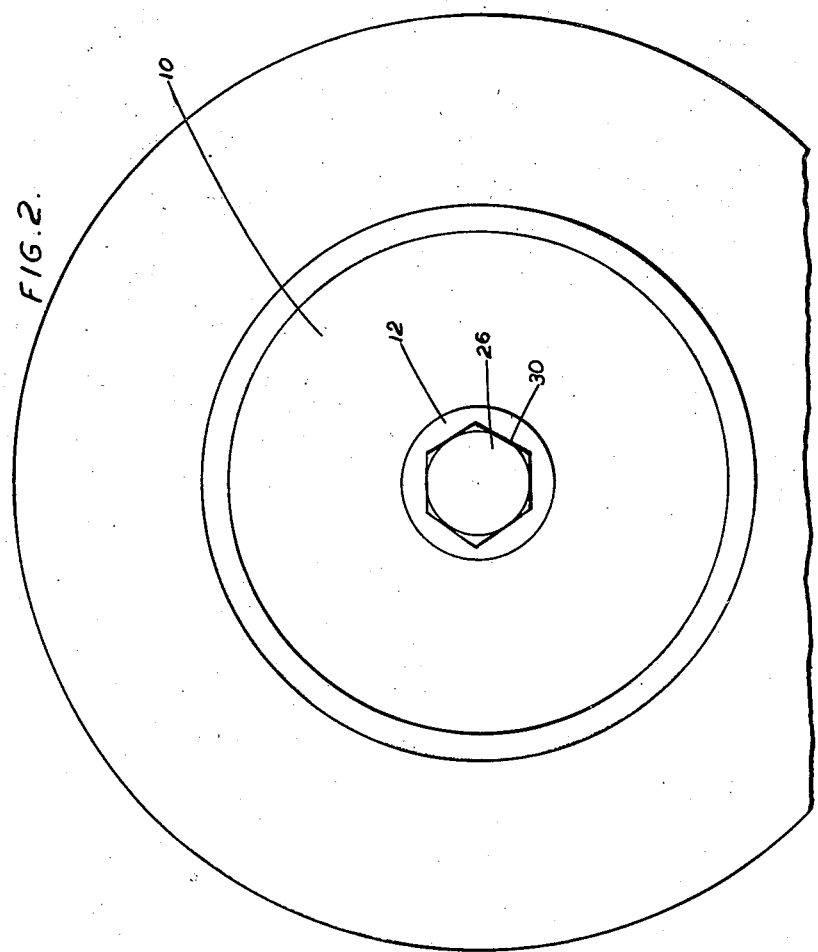

2,502,512

UNITED STATES PATENT OFFICE 2,502,512

FIXING BODIES TO SHAFTS

Georges A. Demetriades, Thessaloniki, Greece

Application August 6, 1946, Serial No. 688,802
In Greece July 17, 1945

2 Claims. (Cl. 287—52.06)

This invention relates to the attachment of bodies such as wheels, pulleys, propellers and the like to shafts.

In accordance with the invention, a shaft and a body attached to it for rotation with it are so formed and connected that movement of one relatively to the other results in a strengthening of the driving connection, the two parts remaining separable by the use of only the simplest tools or even without the use of tools and without the exertion of any considerable force.

The attached drawing shows by way of example an application of the invention to the fixing of a motor car wheel to its shaft.

In the drawing,

Figure 1 is a cross section through the wheel on its shaft, and

Figure 2 is an end elevation of Figure 1.

The wheel 10 has a boss 12 the bore of which has a parallel screw-threaded central portion 14 and two outwardly tapered plain portions 15 and 16.

The shaft 18 has in succession from its end a screw-threaded portion 20, a portion 22 of larger diameter which is also screw-threaded and a tapered portion 24.

The assembly is completed by a member 26 which is externally tapered and has a screw-threaded bore 28.

The central screw-threaded portion 14 of the bore of the boss 12 mates with the larger screw-threaded portion 22 of the shaft 18.

The outer tapered portions 15 and 16 mate respectively with the externally tapered member 26 and the tapered portion 24 of the shaft 18.

The screw-thread on the end portion 20 of the shaft 18 is of opposite hand to that on the larger portion 22 of the shaft and mates with the screw-threaded bore 28 of the member 26.

It will be seen that any tendency which the wheel 10 may have to rotate relatively to the shaft 18 will result in a strengthening of the driving connection. Thus, if the wheel 10 is turned counterclockwise (Figure 2) relatively to the shaft 18, it will tend to move into closer contact with the tapered portion 24 of the shaft; if on the other hand it is turned clockwise, it will tend to move into closer contact with the tapered member 26 and tend to turn that member clockwise relatively to the shaft. The member 26 is thus caused to move further on to the shaft. The attachment is thus self-adjusting until a stable state of affairs is reached in which no further relative movements between the parts can occur.

It will be appreciated by those skilled in the art that by judicious choice of the pitch of the various screw threads and of the angle of taper of the tapered portions having regard to the coefficient of friction between mating parts and the elasticity of the materials of which they are made, it can be contrived that when the above-mentioned stable state is reached the parts will not become tightly wedged. That being so, it becomes clear that the wheel 10 can be removed from its shaft 18 without the exertion of any considerable force.

To remove the wheel, the member 26 has first to be unscrewed from the shaft 18. In general, it will be possible to do this by hand. If, however, it should be somewhat tightly engaged in the bore 15 a simple tool such as a spanner may have to be used. To enable this to be done, the part 26 is provided with a hexagonal head 30.

On removal of the member 26, the wheel 10 can be unscrewed from the shaft 18 by hand.

The mounting of another wheel in its place is a very simple matter. The new wheel has only to be screwed on until it makes contact with the tapered portion 24 of the shaft and the member 26 then screwed on to the end portion 20 of the shaft until it makes contact with the wheel.

Although the invention has been particularly illustrated in the drawings and described above in its application to the attachment of a motor car wheel, it is clear that it is not restricted to that application. The invention can, indeed, be applied to the attachment of any body to a shaft for rotation therewith. Pulleys and propellers are cited as further examples of such bodies.

Where the body and the shaft are required to rotate always in the same sense, the member 26 can be dispensed with, in which case, the screw-threaded end 20 of the shaft becomes superfluous. In such a case, there is still an advantage in having tapered portions 15 and 16 at each end of the bore in the boss 12 as this allows the wheel or other body to be reversed on the shaft when desired.

The shaft 18 could, of course, be built up of several parts instead of being turned out of a solid bar. In particular, the tapered portion 24 could be in the form of a collar mounted on the shaft 18 and fixed thereto by means of a grub screw or other appropriate device.

I claim:

1. An assembly of a shaft having a screw-threaded end portion and a screw-threaded portion of larger diameter spaced from said end followed in the direction away from said end by an outwardly tapered portion, said screw-threads being of opposite hand, a body having a boss for attachment to said shaft, the bore of said boss being tapered at one end to mate with said tapered portion of said shaft and being screw-threaded over its central portion to mate with said larger screw-threaded portion of said shaft, and an internally screw-threaded securing member mating with said smaller screw-threaded portion of said shaft and in endwise contact with said boss to prevent unscrewing of said body from said shaft.

2. An assembly of a shaft having in succession from one of its ends, a first, screw-threaded portion, a second portion of larger diameter than said first portion and having a screw thread of opposite hand to that on said first portion and a third, outwardly tapered portion, of a body having a bore the central portion of which is screw-threaded and the end portions of which are outwardly tapered and of a securing member which is externally tapered and has a screw threaded bore, said screw threaded bore of said securing member mating with said first, screw threaded portion of said shaft, said screw thread bore of said body mating with said second portion of said shaft and said outwardly tapered end portions of said body mating respectively with said third, outwardly tapered portion of said shaft and said externally tapered securing member.

G. A. DEMETRIADES.

REFERENCES CITED

The following references are of record in the file of this patent:

UNITED STATES PATENTS

| Number | Name | Date |
|---|---|---|
| 158,747 | Shimer | Jan. 12, 1875 |
| 380,886 | Hadley | Apr. 10, 1888 |
| 413,943 | Hughes | Oct. 29, 1889 |